Aug. 10, 1954     H. C. COLE     2,686,041

STOCK OR CATTLE GAP HAVING PRONGS

Filed March 2, 1953

INVENTOR
HARRY C. COLE

Aug. 10, 1954

E. J. CARLSON 2,686,095

MASON'S LEVELING TABLE

Filed Oct. 26, 1953

INVENTOR.
ERNEST J. CARLSON
BY
*William J. Ruano*
ATTORNEY

Patented Aug. 10, 1954

2,686,041

UNITED STATES PATENT OFFICE 2,686,041

STOCK OR CATTLE GAP HAVING PRONGS

Harry C. Cole, Douglas, Ga.

Application March 2, 1953, Serial No. 339,658

1 Claim. (Cl. 256—18)

This invention relates to a stock or cattle gap for fences.

It is an object of the present invention to provide a stock or cattle gap for fences adapted to be used in place of a gate and which is made of rubber or the like material which will withstand the weather and wear and tear and wherein the parts thereof as they may be depleted can be easily replaced with new parts.

It is another object of the invention to provide a stock or cattle gap for fences that can be quickly set in place and easily moved from one place to another.

It is another object of the invention to provide a stock or cattle gap that not only can be easily moved but which has teeth that are yieldable so as to readily permit an automobile or tractor to pass through the fence and over the gap.

Other objects of the invention are to provide a stock or cattle gap which is of simple construction, adapted to be manufactured by the yard and purchased to fit any size of gate opening, inexpensive to manufacture, durable, and efficient in operation.

For other objects and for a better understanding of the invention reference may be had to the following detailed description taken in connection with the accompanying drawing, in which.

Figure 1:
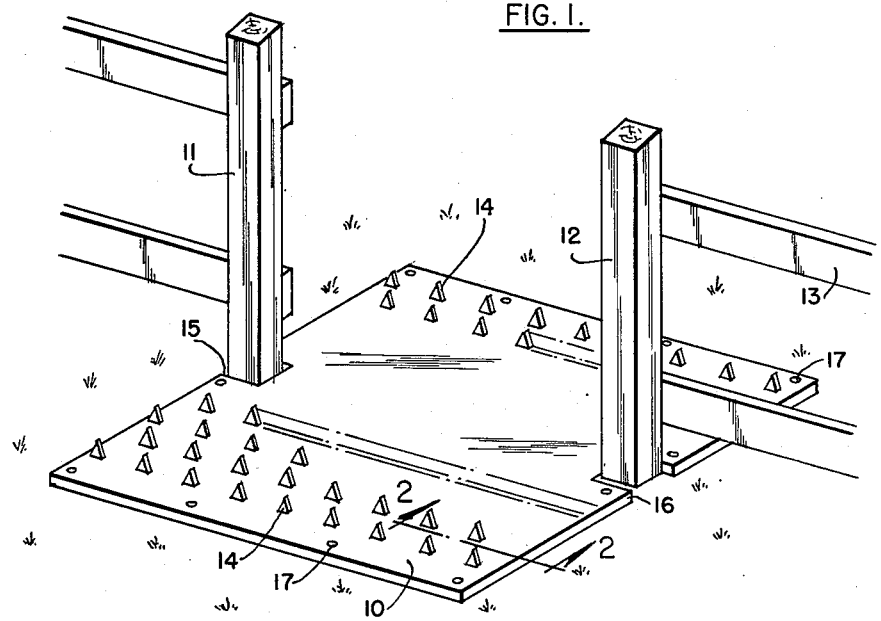
Figure 1 is a perspective view of the stock or cattle gap constructed according to one form of the invention and disposed in place between fence posts.
Figure 2:
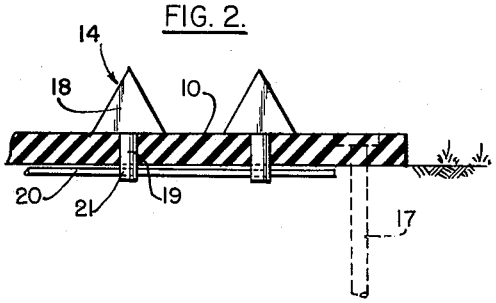
Fig. 2 is a fragmentary enlarged sectional view taken on line 2—2 of Fig. 1.

Referring now particularly to Figs. 1 and 2, there is shown one form of the invention wherein there is provided a rubber mat 10 of sufficient area to extend between fence posts 11 and 12 of a fence 13 and to which there is connected rows of teeth 14 that can be replaced upon being worn or broken. This mat or base is cut away as indicated at 15 and 16 in order to receive the respective posts 11 and 12. The mat or base 10 is held in place by spikes or pins as indicated at 17. It will be apparent that this base or mat 10 can be formed from a strip of rubber and cut to the desired size to be fitted between the fence posts which may vary in distances at which they are set apart.

The teeth may be made of metal or they may also be made of rubber, and according to the form of the invention shown in Fig. 1 they are provided with triangular shaped head portions 18 and a depending shank portion 19, having a lateral hole therein. An anchor wire 20 is extended through the hole as indicated at 21 in the shank of the tooth and in this manner the teeth are held in place.

Figure 3:
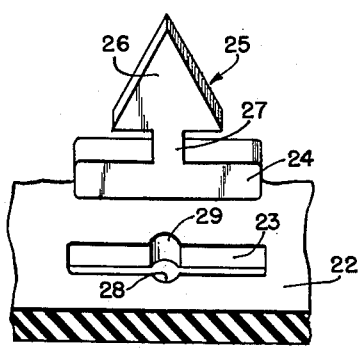
Fig. 3 is an enlarged fragmentary and perspective view of a modified form of construction.

Referring now to the form of the invention shown in Fig. 3, the base portion is indicated at 22 formed of rubber and is provided with elongated slots 23 adapted to receive an elongated retaining portion 24 of a tooth 25. The tooth 25 further includes a triangular shaped head 26 and a shank portion 27 depending therefrom to which the elongated retaining portion 24 for the tooth is connected. The distance between the head 26 and the portion 24 is equal to the thickness of the rubber mat 22. In order to fix the tooth in place, the retaining portion 24 is inserted in slot 23 and then angled to extend transversely beneath the slot 23 and engage with the underface of the mat 22. The sides of the elongated opening or slot 23 are relieved respectively at 28 and 29 in order that the shank 27 may be free to rotate therein and in order to hold the tooth centralized. This tooth 25 can be stamped from rubber or metal and the shank 27 is of square section and the corners of the shank will engage the relieved portions 28 and 29 of the slot to hold the tooth 25 against turning and movement through the slot.

Figure 4:
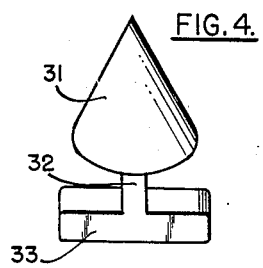
Fig. 4 is an enlarged perspective view of a still further form of the invention wherein a different shaped tooth is provided.
Figure 1:
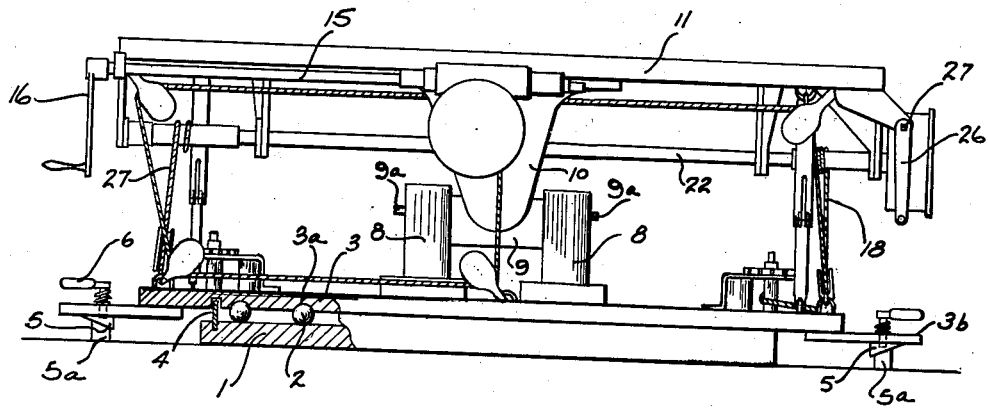
Figure 2:
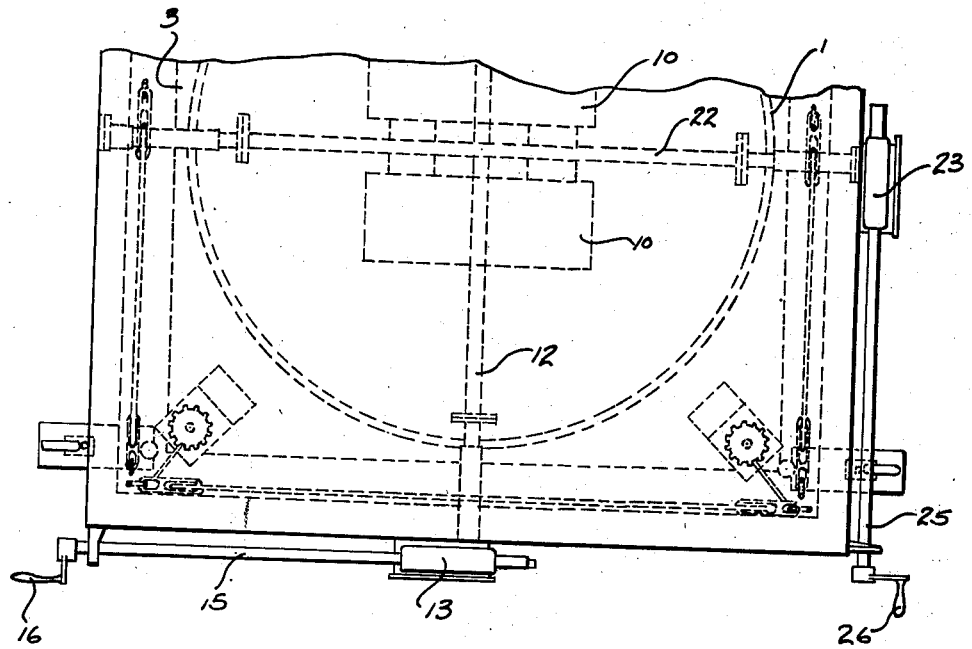

In Fig. 4 there is shown a modified form of tooth adapted to fit the base or mat 22 as shown in Fig. 3. This tooth has a conical head 31, a round shank 32 and an elongated retainer portion 33. This tooth, shown in Fig. 4, can be easily inserted and applied to the mat 22 and moved to a fixed position by angling the same after it is inserted so that its retaining portion 33 is entirely through the slot 23.

Figure 5:
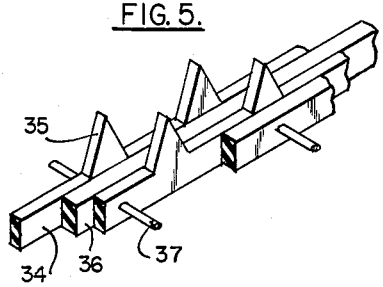
Fig. 5 is a reduced fragmentary perspective view of a still further form of the invention.

In Fig. 5 there is shown a still further form of the invention wherein the entire stock or cattle gap is made up of a series of laminations that are placed side by side and held together by through bolt means. According to this form of the invention, there are formed of rubber or other like material laminations or strips 34 having teeth projections 35 extending upwardly from the upper edge of the strips 34 and longitudinally spaced from one another. These strips 34 are assembled to a mat along with spacing strips 36 and are secured together by through bolts or rods 37. Any number of strips 34 and spacing members 36 can be assembled and any number of retaining bolts or rods 37 can be used. Also, the length of these strips can be varied depending upon the size and shape of the cattle gap which is desired.

It should now be apparent that there has been provided a stock or cattle gap which can be easily constructed adapted to be manufactured by the yard and cut to the desired size and wherein the teeth can be easily replaced.

While various changes may be made in the detailed construction, it shall be understood that such changes shall be within the spirit and scope of the present invention as defined by the appended claim:

What is claimed is:

A stock, or cattle gap comprising a flexible base portion adapted to be fitted between fence posts in a fence, flexible teeth projections extending upwardly from the upper surface of said flexible base portion, each of said flexible teeth projections having a pointed head portion and a vertical shank portion, said shank portion being angular in cross section, and a retaining portion at the lower end of said shank portion and disposed at substantially right angles thereto, said base portion having a plurality of elongated slots adapted to receive said retaining portions therethrough, each of said slots intermediate their ends having circular enlargements engaging the corners of said shank when said flexible teeth and retaining portions thereof are rotated below said base portion out of alignment with said elongated slots.

References Cited in the file of this patent

UNITED STATES PATENTS

| Number | Name | Date |
|---|---|---|
| 682,008 | Wegner | Sept. 3, 1901 |
| 688,221 | Arnold | Dec. 3, 1901 |
| 1,338,006 | Fink | Apr. 27, 1920 |

FOREIGN PATENTS

| Number | Country | Date |
|---|---|---|
| 322,224 | Great Britain | Dec. 2, 1929 |